(12) United States Patent
Johnson

(10) Patent No.: US 11,479,073 B2
(45) Date of Patent: Oct. 25, 2022

(54) VEHICLE BODY ROLL REDUCTION

(71) Applicant: GM GLOBAL TECHNOLOGY OPERATIONS LLC, Detroit, MI (US)

(72) Inventor: Adam Johnson, Oxford, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 349 days.

(21) Appl. No.: 16/809,923

(22) Filed: Mar. 5, 2020

(65) Prior Publication Data

US 2021/0276389 A1 Sep. 9, 2021

(51) Int. Cl.
*B60G 17/019* (2006.01)
*B60G 17/015* (2006.01)
*B60G 17/0165* (2006.01)

(52) U.S. Cl.
CPC ... *B60G 17/01933* (2013.01); *B60G 17/0152* (2013.01); *B60G 17/0165* (2013.01); *B60G 2202/16* (2013.01); *B60G 2400/204* (2013.01)

(58) Field of Classification Search
CPC .... G08G 1/166; G05D 1/0291; G05D 1/0293; G05D 1/0295; B60W 30/085
See application file for complete search history.

(56) References Cited

U.S. PATENT DOCUMENTS

| | | | |
|---|---|---|---|
| 9,308,916 B2 | 4/2016 | Buerkle et al. | |
| 11,046,266 B1 * | 6/2021 | Christensen | B60W 30/095 |
| 2007/0032952 A1 * | 2/2007 | Carlstedt | B60T 7/22 701/45 |
| 2007/0124051 A1 * | 5/2007 | Fujita | B60G 17/0162 701/70 |
| 2021/0061629 A1 * | 3/2021 | Ogawa | G05D 1/0055 |
| 2021/0318695 A1 * | 10/2021 | Cui | G05D 1/0295 |

FOREIGN PATENT DOCUMENTS

| | | |
|---|---|---|
| DE | 102017223502 A1 | 6/2019 |
| DE | 102019219367 A1 * | 6/2021 |
| KR | 1020170028125 * | 3/2017 |

OTHER PUBLICATIONS

Lee et al., Driver Assistance Apparatus For Vehicle And Vehicle, Mar. 13, 2017, EPO, KR 10-2017-0028125 A, Machine Translation of Description (Year: 2017).*

* cited by examiner

*Primary Examiner* — James A English
(74) *Attorney, Agent, or Firm* — Lorenz & Kopf LLP

(57) ABSTRACT

In various embodiments, methods and systems for controlling a suspension system of a vehicle are provided. In one embodiment, a control system includes: one or more first sensors configured to measure a velocity of the vehicle; one or more second sensors configured to detecting one or more additional vehicles that ae moving in relation to the vehicle; and a processor that is coupled to the first sensors and the second sensors and that is configured to provide instructions for adjusting the suspension system of the vehicle, based on the measured velocity of the vehicle and the detected one or more additional vehicles that are moving in relation to the vehicle.

17 Claims, 3 Drawing Sheets

VEHICLE BODY ROLL REDUCTION

INTRODUCTION

The technical field generally relates to the field of vehicles and, more specifically, to controlling body roll in vehicles.

Vehicles today have a number of beneficial features, for use in various situations during operation of the vehicle, including various automated features undertaken by a control system of the vehicle for improvement of the experience for operators and other occupants of the vehicle. However, in certain situations, vehicles may experience body roll due to moving vehicles in proximity thereto.

Accordingly, it is desirable to provide systems and methods for reducing body roll in vehicles. Furthermore, other desirable features and characteristics of the present invention will become apparent from the subsequent detailed description of the invention and the appended claims, taken in conjunction with the accompanying drawings and this background of the invention.

SUMMARY

In an exemplary embodiment, a method is provided for controlling a suspension system for a vehicle, the method including: measuring, via one or more first sensors, a velocity of the vehicle; detecting, via one or more second sensors, one or more additional vehicles that ae moving in relation to the vehicle; and adjusting, via instructions provided by a processor of the vehicle, the suspension system of the vehicle, based on the measured velocity of the vehicle and the detected one or more additional vehicles that are moving in relation to the vehicle.

Also in one embodiment, the method further includes: determining whether the vehicle is stopped, based on the measured velocity; and measuring a velocity of the one or more additional vehicles; wherein the step of adjusting the suspension system includes adjusting a stiffness of the suspension system based on both of the following, namely: whether the vehicle is stopped; and the velocity of the one or more additional vehicles.

Also in one embodiment, the suspension system includes an electromagnetic ride control suspension system; and the step of adjusting the suspension system includes providing an electric charge to the electronic ride control suspension system, to thereby adjust the stiffness thereof, when both of the suspension system, based on both whether the vehicle is stopped and the velocity of the one or more additional vehicles.

Also in one embodiment, the step of adjusting the suspension system includes: stiffening, via the instructions provided by the processor, the suspension system of the vehicle, when both of the following conditions are satisfied at the same time, namely that: the vehicle is stopped; and the velocity of the one or more additional vehicles exceeds a first predetermined velocity threshold.

Also in one embodiment, the step of adjusting the suspension system further including: providing additional instructions for loosening of the suspension system, when, subsequent to the stiffening of the suspension system, one or both of the following occur, namely that: the velocity of the one or more additional vehicles no longer exceeds the first predetermined velocity threshold; or the velocity of the vehicle increases to above a second predetermined velocity threshold.

Also in one embodiment, the method further includes: measuring, via the one or more second sensors, a frontal surface area of the one or more additional vehicles; wherein the step of adjusting the suspension system includes adjusting a stiffness of the suspension system based on each of the following, namely: whether the vehicle is stopped; the velocity of the one or more additional vehicles; and the frontal surface area of the one or more additional vehicles.

Also in one embodiment, the step of adjusting the suspension system includes: stiffening, via the instructions provided by the processor, the suspension system of the vehicle, when each of the following conditions are satisfied at the same time, namely that: the vehicle is stopped; the velocity of the one or more additional vehicles exceeds a first predetermined velocity threshold; and the frontal surface area of the one or more additional vehicles exceeds a predetermined surface area threshold.

In another exemplary embodiment, a system is provided for controlling a suspension system for a vehicle, the system including: one or more first sensors configured to measure a velocity of the vehicle; one or more second sensors configured to detecting one or more additional vehicles that ae moving in relation to the vehicle; and a processor that is coupled to the first sensors and the second sensors and that is configured to provide instructions for adjusting the suspension system of the vehicle, based on the measured velocity of the vehicle and the detected one or more additional vehicles that are moving in relation to the vehicle.

Also in one embodiment, the one or more second sensors are configured to measure a velocity of the one or more additional vehicles; and the processor is further configured to at least facilitate: determining whether the vehicle is stopped, based on the measured velocity; and adjusting a stiffness of the suspension system based on both of the following, namely: whether the vehicle is stopped; and the velocity of the one or more additional vehicles.

Also in one embodiment, the suspension system includes an electromagnetic ride control suspension system; and the processor is configured to provide instructions for providing an electric charge to the electronic ride control suspension system, to thereby adjust the stiffness thereof, when both of the suspension system, based on both whether the vehicle is stopped and the velocity of the one or more additional vehicles.

Also in one embodiment, the processor is configured to provide instructions for stiffening the suspension system of the vehicle, when both of the following conditions are satisfied at the same time, namely that: the vehicle is stopped; and the velocity of the one or more additional vehicles exceeds a first predetermined velocity threshold.

Also in one embodiment, the processor is configured to provide additional instructions for loosening of the suspension system, when, subsequent to the stiffening of the suspension system, one or both of the following occur, namely that: the velocity of the one or more additional vehicles no longer exceeds the first predetermined velocity threshold; or the velocity of the vehicle increases to above a second predetermined velocity threshold.

Also in one embodiment, the one or more second sensors are configured to measure a frontal surface area of the one or more additional vehicles; and the processor is configured to provide instructions for adjusting a stiffness of the suspension system based on each of the following, namely: whether the vehicle is stopped; the velocity of the one or more additional vehicles; and the frontal surface area of the one or more additional vehicles.

Also in one embodiment, the processor is configured to provide instructions for stiffening the suspension system of the vehicle, when each of the following conditions are satisfied at the same time, namely that: the vehicle is stopped; the velocity of the one or more additional vehicles exceeds a first predetermined velocity threshold; and the frontal surface area of the one or more additional vehicles exceeds a predetermined surface area threshold.

In another exemplary embodiment, a vehicle is provided that includes: a suspension system; and a control system including: one or more first sensors configured to measure a velocity of the vehicle; one or more second sensors configured to detecting one or more additional vehicles that ae moving in relation to the vehicle; and a processor that is coupled to the first sensors and the second sensors and that is configured to provide instructions for adjusting the suspension system of the vehicle, based on the measured velocity of the vehicle and the detected one or more additional vehicles that are moving in relation to the vehicle.

Also in one embodiment, the one or more second sensors are configured to measure a velocity of the one or more additional vehicles; and the processor is further configured to at least facilitate: determining whether the vehicle is stopped, based on the measured velocity; and adjusting a stiffness of the suspension system based on both of the following, namely: whether the vehicle is stopped; and the velocity of the one or more additional vehicles.

Also in one embodiment, the suspension system includes an electromagnetic ride control suspension system; and the processor is configured to provide instructions for providing an electric charge to the electronic ride control suspension system, to thereby adjust the stiffness thereof, when both of the suspension system, based on both whether the vehicle is stopped and the velocity of the one or more additional vehicles.

Also in one embodiment, the processor is configured to provide instructions for stiffening the suspension system of the vehicle, when both of the following conditions are satisfied at the same time, namely that: the vehicle is stopped; and the velocity of the one or more additional vehicles exceeds a first predetermined velocity threshold.

Also in one embodiment, the processor is configured to provide additional instructions for loosening of the suspension system, when, subsequent to the stiffening of the suspension system, one or both of the following occur, namely that: the velocity of the one or more additional vehicles no longer exceeds the first predetermined velocity threshold; or the velocity of the vehicle increases to above a second predetermined velocity threshold.

Also in one embodiment, the one or more second sensors are configured to measure a frontal surface area of the one or more additional vehicles; and the processor is configured to provide instructions for stiffening the suspension system of the vehicle, when each of the following conditions are satisfied at the same time, namely that: the vehicle is stopped; the velocity of the one or more additional vehicles exceeds a first predetermined velocity threshold; and the frontal surface area of the one or more additional vehicles exceeds a predetermined surface area threshold.

DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

Figure 1:
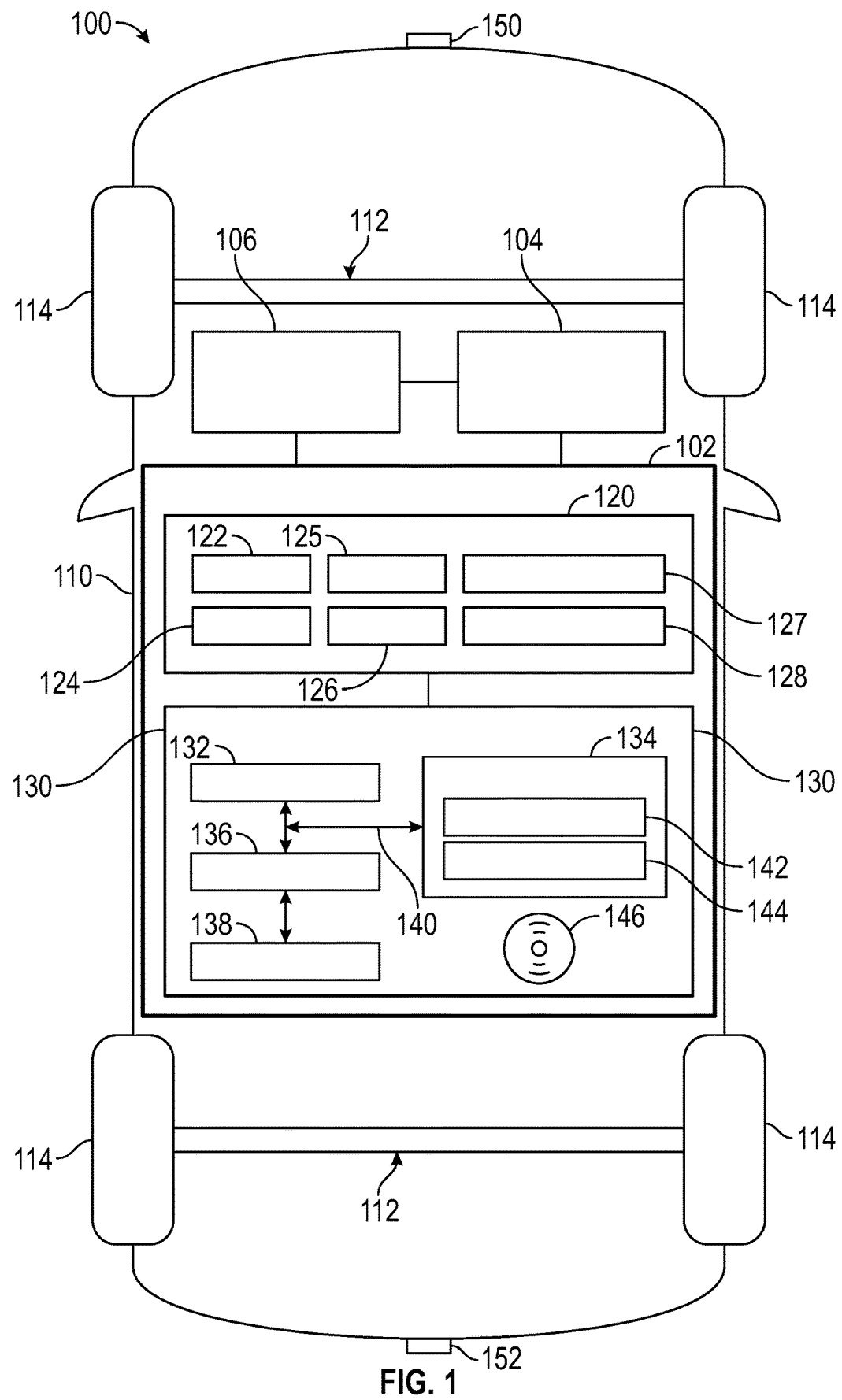
FIG. 1 is a functional block diagram of a vehicle that includes a drive system, a suspension system, and a control system that is used for reducing body roll for the vehicle under certain circumstances, in accordance with an exemplary embodiment.

FIG. 1 illustrates a vehicle 100, according to an exemplary embodiment. As described in greater detail further below, the vehicle 100 includes a suspension system 104 as well as a control system 102 that adjusts the suspension system 104 in order to reduce body roll for the vehicle 100 in various situations, including when other vehicles are approaching, in accordance with exemplary embodiments.

In certain embodiments, the vehicle 100 comprises an automobile. In various embodiments, the vehicle 100 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD), and/or various other types of vehicles in certain embodiments. In certain embodiments, the vehicle 100 may also comprise a motorcycle and/or one or more other types of vehicles. In addition, in various embodiments, it will also be appreciated that the vehicle 100 may comprise any number of other types of mobile platforms.

In the depicted embodiment, the vehicle 100 includes a body that substantially encloses other components of the vehicle 100. Also in the depicted embodiment, the vehicle 100 includes a plurality of axles 112 and wheels 114. The wheels 114 are each rotationally coupled to one or more of the axles 112 near a respective corner of the body 110 to facilitate movement of the vehicle 100. In one embodiment, the vehicle 100 includes four wheels 114, although this may vary in other embodiments (for example for trucks and certain other vehicles).

A drive system 106 drives the wheels 114. The drive system 106 preferably comprises a propulsion system. In certain exemplary embodiments, the drive system 106 comprises an internal combustion engine and/or an electric motor/generator. In certain embodiments, the drive system 106 may vary, and/or two or more drive systems 116 may be used. By way of example, the vehicle 100 may also incorporate any one of, or combination of, a number of different types of propulsion systems, such as, for example, a gasoline or diesel fueled combustion engine, a "flex fuel vehicle" (FFV) engine (i.e., using a mixture of gasoline and alcohol), a gaseous compound (e.g., hydrogen and/or natural gas) fueled engine, a combustion/electric motor hybrid engine, and an electric motor.

In various embodiments the suspension system 104 supports road handling and ride quality for the vehicle 100. In various embodiments, the suspension system 104 comprises a number of components, such as tires, springs, shock absorbers, and the like that connect the body 110 of the vehicle 100 to the wheels 114, that allow relative therebetween, and that support both road handling and ride quality. Also in various embodiments, the suspension 104 may be adjusted by the control system 102 to help prevent or reduce body roll in certain situations, including when the vehicle 100 is stationary and traffic is approaching. In certain embodiments, the suspension system 104 comprises an electromagnetic ride control suspension system that is stiffened by the providing of an electric charge thereto.

Also in various embodiments, the control system 102 provides instructions for controlling the suspension system 104 in order to prevent or reduce body roll for the vehicle 100 in appropriate situations. In various embodiments, the control system 102 provides instructions for stiffening the suspension system 102 when the vehicle 100 is stationary and one or more other vehicles are approaching with at least a predetermined velocity (and/or, in certain embodiments, with at least a predetermined frontal surface area), for example as described further below in connection with the process 200 of FIG. 2 and the exemplary implementation of FIG. 3.

As depicted in FIG. 1, in various embodiments, the control system 102 includes a sensor array 120 and a controller 130.

In various embodiments, the sensor array 120 includes various sensors for measuring a velocity of the vehicle 100 as well as for detecting and pertaining measurements to other vehicles that are in proximity to the vehicle 100. For example, in various embodiments, one or more accelerometers 127, wheel sensors (e.g., wheel speed sensors) 128, and/or a global positioning sensors (GPS) 126 (collectively referred to as "first sensors" herein) are utilized for measuring a velocity of the vehicle 100. Also in various embodiments, one or more lidar sensors 122, radar sensors 124, and/or cameras 125, such as visual cameras, thermal cameras, lane sensing cameras, and/or other cameras (the lidar sensors 122, radar sensors 124, and/or cameras 125 collectively referred to as "second sensors" herein) detect and obtain measurements pertaining to additional vehicles that may be in proximity to the vehicle 100 (e.g., including a velocity and frontal surface area thereof). In various embodiments, the various sensors of the sensor array (including the lidar sensors 122, radar sensors 124, and the cameras 125) are disposed at various locations on the body 110 of the vehicle 100, including both (i) at or proximate the front 150 (e.g., proximate a front end, such as a grille of the vehicle 100), facing forward (e.g., to see other vehicles approaching from the front); and (ii) at or proximate the rear 152 (e.g., proximate a rear end, such as behind a rear seat, trunk, or hatch of the vehicle 100), facing rearward (e.g., to see other vehicles approaching from the rear).

Also in various embodiments, the controller 130 is coupled to the sensor array 120, and provides instructions for controlling the suspension system 104 based on measurements and/or determinations from sensor data obtained from the sensors of the sensor array 120. As depicted in FIG. 1, in various embodiments, the controller 130 comprises a computer system comprising a processor 132, a memory 134, an interface, a storage device 138, a bus 140, and a disk 146.

As depicted in FIG. 1, the controller 130 comprises a computer system. In certain embodiments, the controller 130 may also include the sensor array 120 and/or one or more other vehicle components. In addition, it will be appreciated that the controller 130 may otherwise differ from the embodiment depicted in FIG. 1. For example, the controller 130 may be coupled to or may otherwise utilize one or more remote computer systems and/or other control systems, for example as part of one or more of the above-identified vehicle devices and systems.

In the depicted embodiment, the computer system of the controller 130 includes a processor 132, a memory 134, an interface 136, a storage device 138, and a bus 140. The processor 132 performs the computation and control functions of the controller 130, and may comprise any type of processor or multiple processors, single integrated circuits such as a microprocessor, or any suitable number of integrated circuit devices and/or circuit boards working in cooperation to accomplish the functions of a processing unit. During operation, the processor 132 executes one or more programs 142 contained within the memory 134 and, as such, controls the general operation of the controller 130 and the computer system of the controller 130, generally in executing the processes described herein, such as the process 200 discussed further below in connection with FIG. 2.

The memory 134 can be any type of suitable memory. For example, the memory 134 may include various types of dynamic random access memory (DRAM) such as SDRAM, the various types of static RAM (SRAM), and the various types of non-volatile memory (PROM, EPROM, and flash). In certain examples, the memory 134 is located on and/or co-located on the same computer chip as the processor 132. In the depicted embodiment, the memory 134 stores the above-referenced program 142 along with one or more stored values 144 (e.g., including, in various embodiments, predetermined threshold values for controlled the suspension system).

The bus 140 serves to transmit programs, data, status and other information or signals between the various components of the computer system of the controller 130. The interface 136 allows communications to the computer system of the controller 130, for example from a system driver and/or another computer system, and can be implemented using any suitable method and apparatus. In one embodiment, the interface 136 obtains the various data from the sensor array 120, the drive system 106, the suspension system 106, and/or one or more other components and/or systems of the vehicle 100. The interface 136 can include one or more network interfaces to communicate with other systems or components. The interface 136 may also include one or more network interfaces to communicate with technicians, and/or one or more storage interfaces to connect to storage apparatuses, such as the storage device 138.

The storage device 138 can be any suitable type of storage apparatus, including various different types of direct access storage and/or other memory devices. In one exemplary embodiment, the storage device 138 comprises a program product from which memory 134 can receive a program 142 that executes one or more embodiments of one or more processes of the present disclosure, such as the steps of the process 200 discussed further below in connection with FIG. 2. In another exemplary embodiment, the program product may be directly stored in and/or otherwise accessed by the memory 134 and/or one or more other disks 146 and/or other memory devices.

The bus 140 can be any suitable physical or logical means of connecting computer systems and components. This includes, but is not limited to, direct hard-wired connections, fiber optics, infrared and wireless bus technologies. During operation, the program 142 is stored in the memory 134 and executed by the processor 132.

It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 132) to perform and execute the program. Such a program product may take a variety of forms, and the present disclosure applies equally regardless of the particular type of computer-readable signal bearing media used to carry out the distribution. Examples of signal bearing media include: recordable media such as floppy disks, hard drives, memory cards and optical disks, and transmission media such as digital and analog communication links. It will be appreciated that cloud-based storage and/or other techniques may also be utilized in certain embodiments. It will similarly be appreciated that the computer system of the controller 130 may also otherwise differ from the embodiment depicted in FIG. 1, for example in that the computer system of the controller 130 may be coupled to or may otherwise utilize one or more remote computer systems and/or other control systems.

Figure 2:
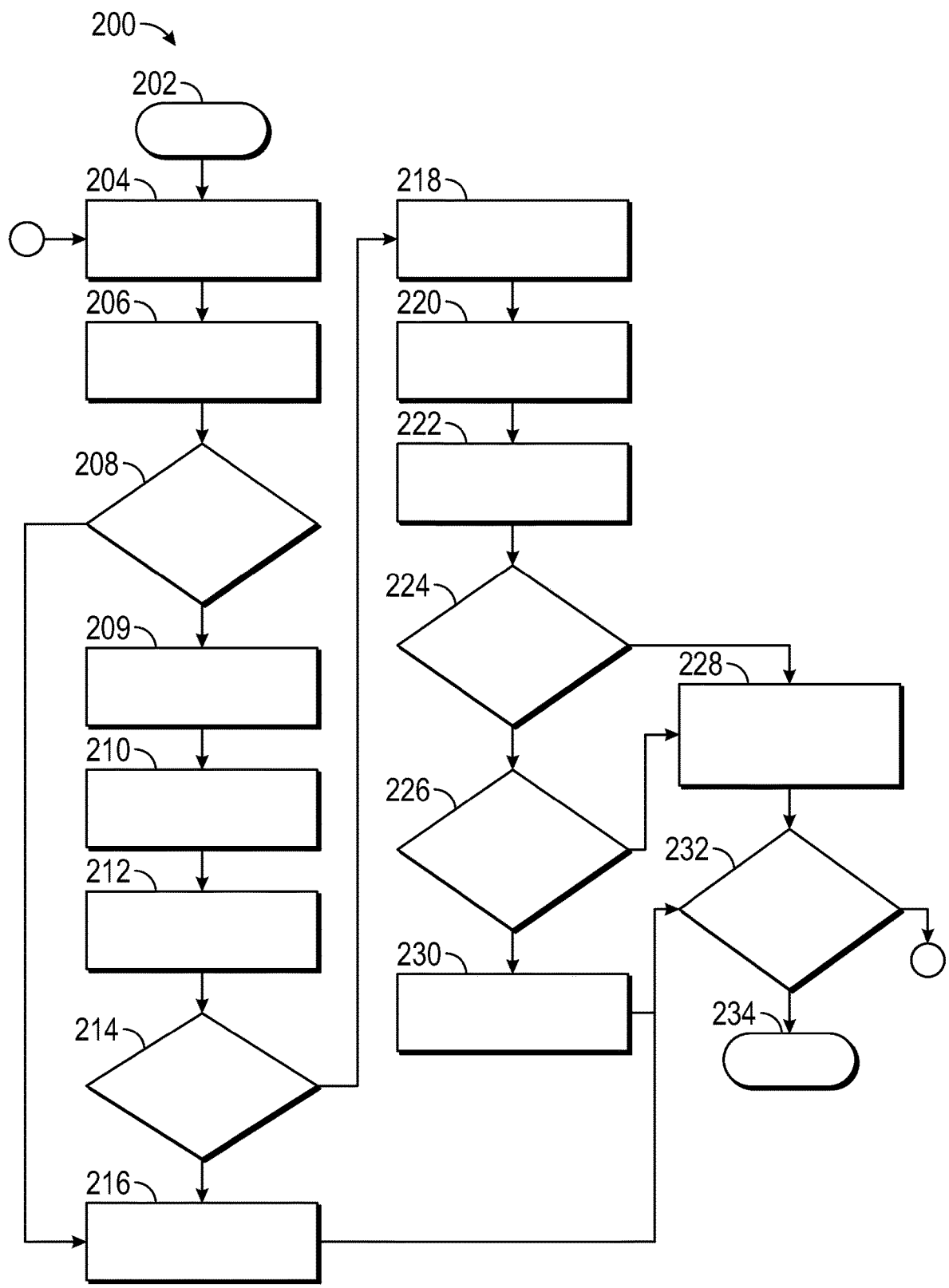
FIG. 2 is a flowchart of a process for controlling a suspension of a vehicle in order to reduce body roll for the vehicle under certain circumstances, and that can be implemented in connection with the vehicle of FIG. 1, in accordance with an exemplary embodiment.

FIG. 2 is a flowchart of a process 200 for controlling a suspension of a vehicle in order to reduce body roll for the vehicle under certain circumstances, in accordance with an exemplary embodiment. In various embodiments, the process 200 may be implemented in connection with the vehicle 100 of FIG. 1, including the suspension system 104 and control system 102 thereof. The process 200 is also described further below in connection with FIG. 3, which provides an illustrative example of an implementation of the process 200 of FIG. 2 in connection with the vehicle 100 of FIG. 1, as depicted on a roadway along with other vehicles, in accordance with various exemplary embodiments.

As depicted in FIG. 2, in various embodiments the process 200 begins at 202. In various embodiments, the process 200 begins when one or more events occur to indicate that a vehicle drive is taking place or about to take place, such as a driver, operator, or passenger entering the vehicle 100, an engine or motor of the vehicle 100 being turned on, a transmission of the vehicle 100 being placed in a "drive" mode, or the like.

Sensor data is collected at 204. In various embodiments, sensor data is collected from various sensors of the sensor array 120 of FIG. 1. Also in various embodiments, sensor data is obtained pertaining to measurements of the vehicle 100 of FIG. 1 (e.g., movement and velocity thereof, such as by one or more accelerometers 126, wheel sensors 127, and/or GPS sensors 128 of FIG. 1) as well as to one or more other vehicles in proximity thereto (e.g., movement, velocity, and frontal surface area thereof, such as by one or more lidar sensors 122, radar sensors 124, and/or cameras 125 of FIG. 1).

A velocity of the vehicle is measured at 206. In various embodiments, a velocity of the vehicle 100 is measured and/or determined based on the sensor values of 204. In certain embodiments, the velocity of the vehicle 100 is measured and/or determined via measurements from one or more of the more accelerometers 126, wheel sensors 127, and/or GPS sensors 128 of FIG. 1 (also referred to herein as "first sensors", as noted above).

A determination is made at 208 as to whether the vehicle is stopped. In various embodiments, during 208, the processor 132 of FIG. 1 makes this determination as to whether the vehicle 100 is stopped, based on the vehicle speed of 206, using the sensor data. In certain embodiments, the vehicle 100 is determined to be stopped when the vehicle 100 is stationary, with a velocity of zero. In certain other embodiments, the vehicle 100 is determined to be stopped when the velocity is less than a predetermined threshold. In certain exemplary embodiments, the predetermined threshold is equal to zero. In certain other exemplary embodiments, one or more other low-speed predetermined thresholds (e.g., one mile per hour in exemplary embodiment, five miles per hour in another exemplary embodiment, and so on) may be utilized for cabin comfort depending upon the type of vehicle (e.g., a large sport utility vehicle may have a different predetermined threshold than a sports car in certain embodiments, and so on).

If it is determined at 208 that the vehicle is not stopped, then the process proceeds to 216, in which no adjustments are made to the suspension system. Specifically, in various embodiments, at 206, the standard (or default) suspension system mode is utilized, without any stiffening. In various embodiments, the process then proceeds to 232, described further below.

Conversely, if it is determined at 208 that the vehicle is stopped, then any approaching vehicles are detected at 209. In various embodiments, during 209, one or more approaching vehicles, which are moving in relation to the vehicle 100, are detected via one or more sensors of the sensor array 120 of FIG. 1, such as via one or more second sensors that include one or more lidar sensors 122, radar sensors 124, and/or cameras 125 thereof. In addition, in various embodiments, these sensors obtain measurements regarding a velocity and frontal surface area of the approaching vehicles at 210 and 212, respectively.

A determination is then made at 214 as to whether body roll is likely for the vehicle 100 as a result of the approaching vehicles. In various embodiments, the processor 132 of FIG. 1 determines whether body roll of the vehicle 100 of FIG. 1 is likely based on a wake generated by the approaching vehicles, using the measurements as to the velocity and/or frontal surface area of the approaching vehicles.

In certain embodiments of 214 (using velocities of the vehicle 100 and approaching vehicles), body roll for the vehicle 100 is determined to be likely when both of the following conditions are satisfied, namely, that: (i) the vehicle 100 is stopped, or deemed slow enough to engage the algorithm and (ii) the velocity of the one or more additional vehicles exceeds a predetermined velocity threshold (and/or that a speed differential between the approaching vehicles and the vehicle 100 exceeds a predetermined velocity threshold). In one exemplary embodiment, this condition may be satisfied when the vehicle 100 speed equals zero and a speed of one or more vehicles of oncoming traffic is greater than or equal to thirty five miles per hour. In another exemplary embodiment, this condition may be satisfied when the vehicle 100 speed is less than or equal to five miles per hour while a speed of one or more vehicles of oncoming traffic is greater than or equal to forty miles per hour, and so on, in different embodiments. In certain embodiments, one or more calibratable stables may be used, and that can be manipulated by calibration engineers to determine the most comfortable conditions for each vehicle 100 (e.g., the calibration table for a large sport utility vehicle may differ from that of a sports car, and so on). An exemplary table (Table 1) is provided below (in which each vertical column represents "Oncoming Vehicle Speed", and each horizontal row represents "Speed Differential (Delta)").

TABLE 1

Speed Differential vs. Oncoming Vehicle Speed

|  |  | Oncoming Vehicle Speed (MPH) | | |
|---|---|---|---|---|
|  |  | 10 MPH | 20 MPH | 30 MPH |
| Speed | 0 MPH | No Stiffening | No | No |
| Differential | 10 MPH | No | Yes | Yes |
| (Delta MPH) | 20 MPH | N/A | Yes | Yes |
|  | 30 MPH | N/A | N/A | Yes |

In certain other embodiments of 214 (using a frontal surface area of the approaching vehicles), body roll for the vehicle 100 is determined to be likely when each of the following three conditions are satisfied, namely, that: (i) the vehicle 100 is stopped, (ii) the velocity of the one or more additional vehicles exceeds a predetermined velocity threshold (and/or that a speed differential between the approaching vehicles and the vehicle 100 exceeds a predetermined velocity threshold); and (iii) the frontal surface area of the one or more additional vehicles exceeds a surface area threshold. In certain embodiments, one or more calibratable stables may be used, and that can be manipulated by calibration engineers to determine the most comfortable conditions for each vehicle 100 (e.g., the calibration table for a large sport utility vehicle may differ from that of a sports car, and so on). An exemplary table (Table 2) is provided below (in which each vertical column represents "Oncoming Vehicle Frontal Area", and each horizontal row represents "Speed Differential" (in miles per hour).

TABLE 2

Oncoming Vehicle Frontal Area vs. Speed Differential

|  |  | Oncoming Vehicle Frontal Area (Sqft) | | |
|---|---|---|---|---|
|  |  | 10 | 20 | 30 |
| Speed | 0 MPH | No Stiffening | No | No |
| Differential | 10 MPH | No | No | Yes |
| (MPH) | 20 MPH | No | Yes | Yes |
|  | 30 MPH | Yes | Yes | Yes |

If it is determined at 214 that body roll for the vehicle 100 is not likely due to the approaching vehicles, then the process proceeds to the above-referenced 216, in which no adjustments are made to the suspension system (i.e., in which the standard or default suspension system mode is utilized, without any stiffening). In various embodiments, the process then proceeds to 232, described further below.

Conversely, if it is determined at 214 that body roll for the vehicle 100 is likely due to the approaching vehicles, then the process proceeds to 218, as a command is generated to adjust the suspension system. Specifically, in various embodiments, the processor 132 of FIG. 1 provides instructions, via the command, for a stiffening of the suspension system 104 of FIG. 1, in order to prevent or reduce body roll for the vehicle 100 from the approaching vehicles. In certain embodiments in which the suspension system 104 comprises an electromagnetic ride control system, and the processor provides instructions for providing an electric charge to the electronic ride control suspension system, to thereby adjust the stiffness thereof, during 218. Also in various embodiments, the command is executed at 220 by the suspension system 104. In various embodiments, the suspension system may be stiffened via any one or more of a number of techniques such as, by way of example through: (a) electromagnetic fluid being magnetized to increase the pressure drop across the dampener orifice such as in existing suspension systems, in response to the signal provided by a processor; (b) a change in an internal orifice of a shock that would alter the dampening of the system, in response to a signal provided by the processor; and/or (c) one or more other techniques as implemented in connection with an electromechanical system on the suspension that allows the suspension to react when commanded, and so on.

In various embodiments, the vehicle 100 continues operation with the stiffened suspension system at 222. In various embodiments, movement of the vehicle 100 begins upon instructions provided by an operator thereof (e.g., via engagement of an accelerator pedal and/or other device), as the sensor data of 204 continues to be obtained and monitored in new iterations.

A determination is made at 224 as to whether the velocity of the vehicle 100 has exceeded a predetermined threshold. In certain embodiments, this determination is made by the processor 132 of FIG. 1 using the sensor data of the new iterations of 204 and monitoring and/or analysis thereof (e.g., in new iterations of 206 and 208). In certain embodiments, the predetermined threshold of 224 is the same as that utilized in 208, described above. In certain other embodiments, the thresholds of 208 and 224 may differ from one another. For example, in certain embodiments and in certain situations, the stiffening of the suspension system may be stiffened, initially, when the vehicle 100 comes to a complete stop, and the suspension system may remain in its stiffened state until the vehicle 100 speed exceeds a different predetermined threshold (e.g., five miles per hour, in one exemplary embodiment), for example to cover a situation in which a vehicle is slowly approaching a traffic light, and so on. Also in various embodiments, one or more calibratable tables may be utilized to allow for specific vehicle conditions to be captured based on individual vehicle size, weight and suspension characteristics.

If it is determined at 224 that the speed of the vehicle 100 is greater than the predetermined threshold, then the suspension system 104 is adjusted back to its standard (or default) state at 228. Specifically, in certain embodiments, during 228, the processor 132 of FIG. 1 provides instructions to undo the stiffening of the suspension system 104 of 210 and 220, so that the suspension system 104 returns to its default, or "unstiffened" state (e.g., in certain embodiments, by removing an electric charge that was being provided to the electronic ride control suspension system). Also in various embodiments, the instructions are implemented by the suspension system 104. In various embodiments, the process then proceeds to 232, described further below.

Conversely, if it is instead determined at 224 that the speed of the vehicle 100 is less than or equal to the predetermined threshold, then a determination is made at 226 as to whether body roll for the vehicle 100 is still likely from approaching traffic. Specifically, in various embodiments, a determination is made by the processor 132 of FIG. 1 as to whether body roll for the vehicle 100 is still likely, based on the velocity and/or frontal surface area of any oncoming vehicles, using the same determinations and thresholds from 214, described above.

If it is determined at 226 that body roll of the vehicle 100 is unlikely from any approaching vehicles 100 (e.g., if there are no more approaching vehicles, and/or if the velocity and/or frontal surface area of any approaching vehicles are less than or equal to their predetermined thresholds), then the process proceeds to the above-referenced 228, in which the suspension system 104 returns to its default, or "unstiffened" state. In various embodiments, the process then proceeds to 232, described further below.

Conversely, if it is instead determined at 226 that body roll of the vehicle 100 is likely from any approaching vehicles 100 (e.g., if there are still approaching vehicles having a velocity and/or frontal surface area that are greater than their predetermined thresholds), then the process proceeds instead to 230, as the suspension system 104 remains in its stiffened state of 218, 220. In various embodiments, the process then proceeds to 232, described directly below.

In various embodiments, during 232, a determination is made as to whether the current vehicle drive for the vehicle 100 is complete. In certain embodiments, the vehicle drive may be determined to be complete by the processor 132 of FIG. 1, for example, when the vehicle 100 has reached a desired destination (e.g., as inputted via a navigation system), and/or when an operator of the vehicle 100 has turned off and/or exited the vehicle 100, or the like.

In various embodiments, if the vehicle drive is not yet complete, the process returns to 204, with additional sensor data. Conversely, in various embodiments, the process ends at 234 once the vehicle drive is complete.

Figure 3:
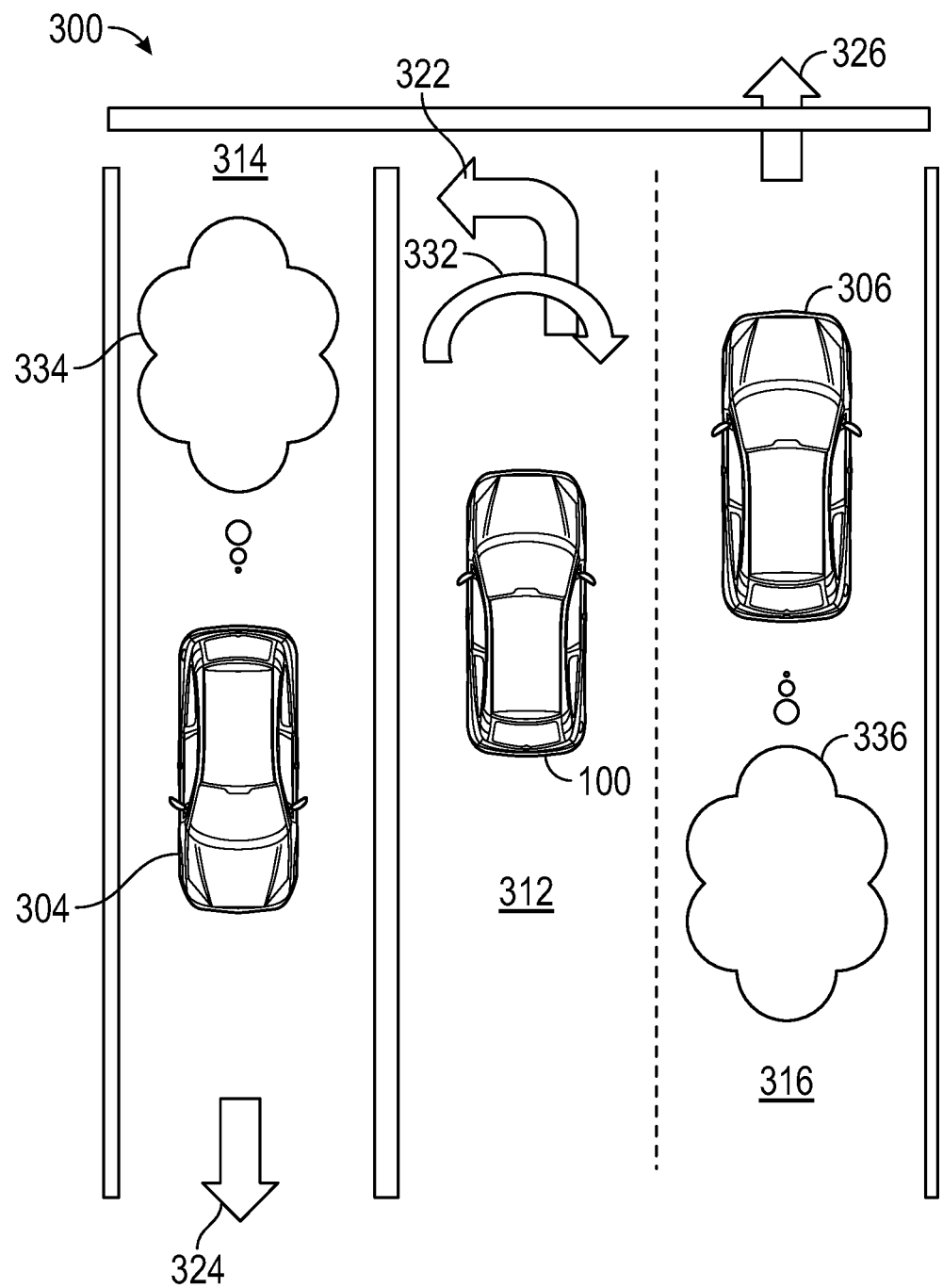
FIG. 3 is a schematic diagram of an illustrative example of an implementation of the process of FIG. 2 in connection with the vehicle of FIG. 1, as depicted on a roadway along with other vehicles, in accordance with various exemplary embodiments.

FIG. 3 provides an illustrative example of an implementation of the process 200 of FIG. 2, in accordance with exemplary embodiments. As depicted in FIG. 3, the vehicle 100 is positioned on a roadway 300 in a first lane 312 (e.g., in one embodiment, waiting to make a left turn in accordance with 322, although this may vary in other. Approaching vehicles 304, 306 are depicted in different respective lanes 314, 316. In the depicted example, approaching vehicle 304 is travelling in a first direction 324, namely front to rear with respect to the vehicle 100. Conversely, also in the depicted example, approaching vehicle 306 is travelling in an opposing direction 326, namely rear to front with respect to the vehicle 100. As shown in FIG. 3, approaching vehicles 304, 306 would typically generate respective wakes 314, 316 that would cause body roll for the vehicle 100 (e.g., corresponding to direction 332 if caused by vehicle 304 in certain embodiments, and so on); however, this is prevented or mitigated by the stiffening of the suspension system 104 in accordance with the process 200 described above in connection with FIG. 2.

Accordingly, methods, systems, and vehicles are provided that can reduce or prevent body roll for a vehicle from approaching vehicles. In various embodiments, a suspension system of the vehicle is stiffened when the vehicle is stopped and vehicle body roll is likely from approaching vehicles (e.g., due to the velocity and/or frontal surface area of the approaching vehicles), to thereby alleviate body roll for the stationary vehicle. This methods, systems, and vehicles can alleviate vehicle body roll in various situations, for example, when the vehicle is waiting to turn left in traffic, and/or is waiting in traffic in one lane when traffic is moving faster in one or more other lanes, among various other different potential applications in which the vehicle is stopped in traffic.

It will be appreciated that the systems, vehicles, applications, and implementations may vary from those depicted in the Figures and described herein. For example, in various embodiments, the vehicle 100, control system 102, suspension system 104, components thereof, and/or other components may differ from those depicted in FIG. 1 and/or described above in connection therewith. It will also be appreciated that the steps of the process 200 may differ, and/or that various steps thereof may be performed simultaneously and/or in a different order, than those depicted in FIG. 2 and/or described above. It will also be appreciated that implementations of the process 200 and/or vehicle 100 may differ from those depicted in FIG. 3 and/or described above.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof

What is claimed is:

1. A method for controlling a suspension system for a vehicle, the method comprising:
   measuring, via one or more first sensors, a velocity of the vehicle;
   determining whether the vehicle is stopped, based on the measured velocity;
   detecting, via one or more second sensors, one or more additional vehicles that are moving in relation to the vehicle;
   measuring a velocity of the one or more additional vehicles; and
   adjusting, via instructions provided by a processor of the vehicle, the suspension system of the vehicle, based on the measured velocity of the vehicle and the detected one or more additional vehicles that are moving in relation to the vehicle, wherein the step of adjusting the suspension system comprises adjusting a stiffness of the suspension system based on both of the following, namely:
   whether the vehicle is stopped; and
   the velocity of the one or more additional vehicles.

2. The method of claim 1, wherein:
   the suspension system comprises an electromagnetic ride control suspension system; and
   the step of adjusting the suspension system comprises providing an electric charge to the electronic ride control suspension system, to thereby adjust the stiffness thereof, when both of the suspension system, based on both whether the vehicle is stopped and the velocity of the one or more additional vehicles.

3. The method of claim 1, wherein the step of adjusting the suspension system comprises:
   stiffening, via the instructions provided by the processor, the suspension system of the vehicle, when both of the following conditions are satisfied at the same time, namely that:
   the vehicle is stopped; and
   the velocity of the one or more additional vehicles exceeds a first predetermined velocity threshold.

4. The method of claim 3, wherein the step of adjusting the suspension system further comprising:
   providing additional instructions for loosening of the suspension system, when, subsequent to the stiffening of the suspension system, one or both of the following occur, namely that:
   the velocity of the one or more additional vehicles no longer exceeds the first predetermined velocity threshold; or the velocity of the vehicle increases to above a second predetermined velocity threshold.

5. The method of claim 1, further comprising:
measuring, via the one or more second sensors, a frontal surface area of the one or more additional vehicles;
wherein the step of adjusting the suspension system comprises adjusting a stiffness of the suspension system based on each of the following, namely:
the velocity of the one or more additional vehicles; and
the frontal surface area of the one or more additional vehicles.

6. The method of claim 5, wherein the step of adjusting the suspension system comprises:
stiffening, via the instructions provided by the processor, the suspension system of the vehicle, when each of the following conditions are satisfied at the same time, namely that:
the vehicle is stopped;
the velocity of the one or more additional vehicles exceeds a first predetermined velocity threshold; and
the frontal surface area of the one or more additional vehicles exceeds a predetermined surface area threshold.

7. A system for controlling a suspension system for a vehicle, the system comprising:
one or more first sensors configured to measure a velocity of the vehicle;
one or more second sensors configured to one or more additional vehicles that are moving in relation to the vehicle and configured to measure a velocity of the one or more additional vehicles; and
a processor that is coupled to the first sensors and the second sensors and that is configured to provide instructions for adjusting the suspension system of the vehicle, based on the measured velocity of the vehicle and the detected one or more additional vehicles that are moving in relation to the vehicle, and wherein the processor is further configured to at least facilitate:
determining whether the vehicle is stopped, based on the measured velocity; and
adjusting a stiffness of the suspension system based on both of the following, namely:
whether the vehicle is stopped; and
the velocity of the one or more additional vehicles.

8. The system of claim 7, wherein:
the suspension system comprises an electromagnetic ride control suspension system; and
the processor is configured to provide instructions for providing an electric charge to the electronic ride control suspension system, to thereby adjust the stiffness thereof, when both of the suspension system, based on both whether the vehicle is stopped and the velocity of the one or more additional vehicles.

9. The system of claim 7, wherein the processor is configured to provide instructions for stiffening the suspension system of the vehicle, when both of the following conditions are satisfied at the same time, namely that:
the vehicle is stopped; and
the velocity of the one or more additional vehicles exceeds a first predetermined velocity threshold.

10. The system of claim 9, wherein the processor is configured to provide additional instructions for loosening of the suspension system, when, subsequent to the stiffening of the suspension system, one or both of the following occur, namely that:

the velocity of the one or more additional vehicles no longer exceeds the first predetermined velocity threshold; or
the velocity of the vehicle increases to above a second predetermined velocity threshold.

11. The system of claim 7, wherein:
the one or more second sensors are configured to measure a frontal surface area of the one or more additional vehicles; and
the processor is configured to provide instructions for adjusting a stiffness of the suspension system based on each of the following, namely:
whether the vehicle is stopped;
the velocity of the one or more additional vehicles; and
the frontal surface area of the one or more additional vehicles.

12. The system of claim 11, wherein the processor is configured to provide instructions for stiffening the suspension system of the vehicle, when each of the following conditions are satisfied at the same time, namely that:
the vehicle is stopped;
the velocity of the one or more additional vehicles exceeds a first predetermined velocity threshold; and
the frontal surface area of the one or more additional vehicles exceeds a predetermined surface area threshold.

13. A vehicle comprising:
a suspension system; and
a control system comprising:
one or more first sensors configured to measure a velocity of the vehicle;
one or more second sensors configured to detecting one or more additional vehicles that are moving in relation to the vehicle and configured to measure a velocity of the one or more additional vehicles; and
a processor that is coupled to the first sensors and the second sensors and that is configured to provide instructions for adjusting the suspension system of the vehicle, based on the measured velocity of the vehicle and the detected one or more additional vehicles that are moving in relation to the vehicle, wherein the processor is further configured to at least facilitate:
determining whether the vehicle is stopped, based on the measured velocity; and
adjusting a stiffness of the suspension system based on both of the following, namely:
whether the vehicle is stopped; and
the velocity of the one or more additional vehicles.

14. The vehicle of claim 13, wherein:
the suspension system comprises an electromagnetic ride control suspension system; and
the processor is configured to provide instructions for providing an electric charge to the electronic ride control suspension system, to thereby adjust the stiffness thereof, when both of the suspension system, based on both whether the vehicle is stopped and the velocity of the one or more additional vehicles.

15. The vehicle of claim 13, wherein the processor is configured to provide instructions for stiffening the suspension system of the vehicle, when both of the following conditions are satisfied at the same time, namely that:
the vehicle is stopped; and
the velocity of the one or more additional vehicles exceeds a first predetermined velocity threshold.

16. The vehicle of claim 15, wherein the processor is configured to provide additional instructions for loosening of the suspension system, when, subsequent to the stiffening of the suspension system, one or both of the following occur, namely that:
- the velocity of the one or more additional vehicles no longer exceeds the first predetermined velocity threshold; or
- the velocity of the vehicle increases to above a second predetermined velocity threshold.

17. The vehicle of claim 13, wherein:
- the one or more second sensors are configured to measure a frontal surface area of the one or more additional vehicles; and
- the processor is configured to provide instructions for stiffening the suspension system of the vehicle, when each of the following conditions are satisfied at the same time, namely that:
  - the vehicle is stopped;
  - the velocity of the one or more additional vehicles exceeds a first predetermined velocity threshold; and
  - the frontal surface area of the one or more additional vehicles exceeds a predetermined surface area threshold.

\* \* \* \* \*